(12) United States Patent
Block

(10) Patent No.: US 9,656,890 B2
(45) Date of Patent: May 23, 2017

(54) TREATMENT OF ARSENIC CONTAMINATED SOIL AND WATER

(71) Applicant: PeroxyChem LLC, Philadelphia, PA (US)

(72) Inventor: Philip A. Block, Garnet Valley, PA (US)

(73) Assignee: PeroxyChem, LLC, Philadelphia, PA (US)

( * ) Notice: Subject to any disclaimer, the term of this patent is extended or adjusted under 35 U.S.C. 154(b) by 53 days.

(21) Appl. No.: 14/538,119

(22) Filed: Nov. 11, 2014

(65) Prior Publication Data

US 2015/0129507 A1 May 14, 2015

Related U.S. Application Data

(60) Provisional application No. 61/902,416, filed on Nov. 11, 2013.

(51) Int. Cl.
| | | |
|---|---|---|
| *C02F 1/72* | (2006.01) | |
| *B09C 1/08* | (2006.01) | |
| *C02F 1/52* | (2006.01) | |
| *C02F 1/62* | (2006.01) | |
| *C02F 101/10* | (2006.01) | |
| *C02F 103/06* | (2006.01) | |
| *C02F 1/70* | (2006.01) | |

(52) U.S. Cl.
CPC ............... *C02F 1/722* (2013.01); *B09C 1/08* (2013.01); *C02F 1/5236* (2013.01); *C02F 1/62* (2013.01); *B09C 2101/00* (2013.01); *C02F 1/705* (2013.01); *C02F 1/725* (2013.01); *C02F 2101/103* (2013.01); *C02F 2103/06* (2013.01); *C02F 2305/023* (2013.01)

(58) Field of Classification Search
None
See application file for complete search history.

(56) References Cited

U.S. PATENT DOCUMENTS

| | | | |
|---|---|---|---|
| 8,366,350 B2 | 2/2013 | Swearingen et al. | |
| 2008/0264876 A1* | 10/2008 | Block | B09C 1/002 210/759 |
| 2008/0272063 A1* | 11/2008 | Boulos | A62D 3/38 210/759 |
| 2012/0322696 A1 | 12/2012 | Hayes et al. | |

FOREIGN PATENT DOCUMENTS

| | | | |
|---|---|---|---|
| CN | 102642951 | | 8/2012 |
| CN | 103342410 | | 10/2013 |
| CN | 103342410 A | * | 10/2013 |
| CN | 103342410 A | | 10/2013 |

OTHER PUBLICATIONS

Tkaczynska, A., "Removal of As from groundwater by in situ bioprecipitation and zero-valent iron", Water science and technology: A Journal of the International Association on Water Pollution Research, Oct. 19, 2013, vol. 68, No. 9, pp. 2055-2060.
International Search Report and Written Opinion issued for corresponding PCT Application No. PCT/US2014/064943.
Magalhaes, Arsenic. An environmental problem limited by solubility. Pure Appl. Chem vol. 74, No. 10, pp. 1843-1850 (2002).
Clifford et al, Oxidizing Arsenic III to Arsenic V for Better Removal, Water and Wastes Digest, Aug. 13, 2011.

* cited by examiner

*Primary Examiner* — Chester Barry
(74) *Attorney, Agent, or Firm* — Duane Morris LLP

(57) ABSTRACT

The present invention is directed to a method for the treatment of an environmental medium contaminated with arsenic, comprising treating such medium with an effective amount of persulfate and zero valent iron.

16 Claims, No Drawings

TREATMENT OF ARSENIC CONTAMINATED SOIL AND WATER

CROSS REFERENCE TO RELATED APPLICATIONS

This application claims the benefit of the filing date of U.S. Provisional Application No. 61/902,416 which was filed Nov. 11, 2013. The entire content of U.S. Provisional Application No. 61/902,416 is hereby incorporated by reference herein.

FIELD OF THE INVENTION

The present invention relates to a method of treating an arsenic contaminated environmental medium, such as soil and water such as groundwater, process water and wastewater, comprising treating such medium with an effective amount of a persulfate and zero valent iron.

BACKGROUND OF THE INVENTION

The contamination of subsurface soils and water with arsenic is a well-documented problem, due to the toxic and carcinogenic effects of such compound. Naturally occurring arsenic or arsenic which is present through human activities can contaminate groundwater as the water passes through contaminated soil. Such contaminant may then be transported into drinking water sources, lakes, and rivers from such groundwater. The arsenic present in soil and/or groundwater is generally present as arsenite (As(III)) or arsenate (As(V)) species. As is noted by Magalhaes, *Arsenic. An environmental problem limited by solubility*. Pure Appl. Chem Vol. 74, No. 10, pp. 1843-1850 (2002), arsenite species are more toxic than arsenates, with metal arsenites being much more soluble in water than their corresponding metal arsenates.

The art has attempted to address remediation of soil and groundwater contaminated with arsenic through a variety of methods. Among the methods which have been employed is the precipitation of metal arsenates, particularly of calcium, magnesium and iron (III) arsenates. However, Magalhaes, cited above, concludes that such methods are "unlikely to produce aqueous solutions with arsenic concentrations below the guideline values proposed for arsenic dissolved in potable water and treated sewage effluents" (Abstract).

Clifford et al, *Oxidizing Arsenic III to Arsenic V for Better Removal*, Water and Wastes Digest, Aug. 13, 2011, discloses that processes to remove arsenic from water which rely on anion removal (including anion exchange and activated alumina adsorption) are only effective when the As(III) present is first oxidized to As(V). However, this publication stresses that such oxidation treatment should occur in the absence of sulfates, stating that "high sulfate concentration negatively affects the ion exchange process".

Accordingly, it is entirely unexpected that a process which relies on sulfate radicals to oxidize As(III) to As(V) which is then precipitated to form stable, water insoluble materials, would be effective to reduce the content of soluble arsenic present in soil and/or water.

SUMMARY OF THE INVENTION

The present invention is directed to a method for the treatment of an environmental medium contaminated with arsenic, comprising treating such medium with an effective amount of persulfate and zero valent iron ("ZVI"). Although not wishing to be held to any theory, it is believed that the ZVI will generate sulfate radicals from the persulfate, which radicals will oxidize the arsenic (III) species present to arsenic (V). The residual sulfate from such persulfate reaction is converted into sulfide through the action of nascent sulfate reducing bacteria in the environment; with the subsequent formation of stable arsenic-sulfide-iron precipitates. Soluble, toxic arsenic is thereby removed from the environmental medium, thereby reducing the potential for human hazard.

DESCRIPTION OF THE PREFERRED EMBODIMENTS

The present invention is directed to a method for the treatment of an environmental medium contaminated with arsenic, comprising treating such medium with an effective amount of persulfate and zero valent iron.

The environmental media which may be treated by the method of this invention include soil, sediment, clay, rock, and the like (hereinafter collectively referred to as "soil"), groundwater (i.e., water found underground in cracks and spaces in soil, sand and rocks), process water (i.e., water resulting from various industrial processes) and wastewater (i.e., water containing domestic or industrial waste). In addition, the method of this invention may be used to treat sludges, sands or tars.

The persulfate compound employed in the method of this invention may be a monopersulfate, a dipersulfate or mixtures thereof. Monopersulfates which may be employed include sodium and potassium monopersulfate. Dipersulfates which may be employed include sodium persulfate, potassium persulfate, and ammonium persulfate with sodium persulfate being particularly preferred.

The zero valent iron employed in the method of this invention is typically in particulate form. The particle size of such ZVI may vary from nanoscale, i.e., from 10 nanometers to 1 micron to micro scale, i.e., from 1 micron to 300 microns. Zero valent iron within these size ranges is generally commercially available.

The peroxygen compound and zero valent iron may be mixed together and the composition shipped or stored prior to being combined with water in the same vessel prior to injection. Alternatively, solutions/suspensions of the peroxygen compound and the iron can be injected simultaneously or sequentially in which the case the composition is formed in the environmental medium. If injected sequentially, it is preferable that the iron is injected first. In another embodiment, the zero valent iron may be in a permeable reaction barrier (PRB) and the persulfate introduced into the environmental medium upgradient from the PRB.

The method of this invention may further comprise the addition of one or more precipitation additives which will enhance the formation of arsenic precipitates, including phosphate salts, calcium hydroxide and oxide, sodium hydroxide, and sodium and/or calcium carbonate salts.

Preferably, the persulfate and zero valent iron are injected together in a composition comprised of a suspension of zero valent iron in an aqueous solution of persulfate. Typically, the concentration of persulfate in the solution is from 0.5 mg/L to 250,000 mg/L, and the concentration of the zero valent iron in the suspension is from 1 ppm to 1000 ppm on a metal basis. The weight ratio of persulfate to zero valent iron in such compositions is preferably between 1:1 and 20:1; and is more preferably between 5:1 and 15:1.

The persulfate and zero valent iron are injected in an amount effective to reduce the concentration of arsenic (III)

compounds present. It is preferred that enough persulfate be injected to satisfy the soil oxidant demand, compensate for any decomposition and oxidize the majority of arsenic (III) compound present. Soil oxidant demand, (SOD), is the loss of persulfate due to reaction with soil matrix components as well as through auto-decomposition of the persulfate, as well as the chemical oxidant demand, and to compensate for any decomposition of the persulfate.

One method for calculating the preferred amount of persulfate to be used per unit soil mass (for an identified volume of soil at the site) is to first determine the minimum amount of persulfate needed to fully satisfy soil oxidant demand per unit mass of uncontaminated soil. A contaminated soil sample from the identified volume of soil is then treated with that predetermined (per unit mass) amount of persulfate; and the minimum amount of persulfate required to eliminate the organic compounds in that treated sample is then determined. Chemical reaction stoichiometry governs the mass/mass ratios and thus the total amount required to achieve the desired result. In actuality the amount of persulfate injected into various locations at a single contaminated site will vary depending upon what is learned from the core samples and other techniques for mapping what is believed to be the subsurface conditions.

SOD also may be calculated according to the formula (I):

$$SOD = V*(C_O - C_f)/m_s \quad (I)$$

Where V=volume of the groundwater used in the sample
$C_0$=initial concentration of persulfate at time 0
$C_f$=concentration of persulfate after 48 hours
$M_s$=mass of soil used in the sample When treating groundwater, process water or wastewater, the concentration of persulfate in the solution used in the present invention will typically vary from 0.5 mg/L to greater than 250,000 mg/L. When treating soil, the concentration of persulfate employed will typically range from 0.5 to 50 g/kg of soil. The preferred concentrations are a function of the soil characteristics, including the site-specific oxidant demands. Hydrogeologic conditions govern the rate of movement of the chemicals through the soil, and those conditions must be considered together with the soil chemistry to understand how best to perform the injection. The techniques for making these determinations and performing the injections are well known in the art. For example, wells or borings can be drilled at various locations in and around the suspected contaminated site to determine, as closely as possible, where the contamination is located. Core samples can be withdrawn, being careful to protect the samples from atmospheric oxidation. The samples can then be used to determine soil oxidant demand, arsenic (III) oxidant demand and the oxidant stability existing in the subsurface.

The goal is for the concentration of persulfate compound in the injected solution to be just enough to result in the persulfate compound reaction front traveling throughout the area of contamination requiring treatment in sufficient quantity to oxidize the contaminants present. (The saturated soil zone is the zone of soil which lies below the water table and is fully saturated. This is the region in which groundwater exists and flows.) In certain saturated zones where the natural velocity of the groundwater is too slow for the purposes of treatment within a certain timeframe, the velocity of groundwater can be increased by increasing the flow rate of the injected persulfate solution or installation of groundwater extraction wells to direct the flow of the injected persulfate compound solution. Certain soils to be treated may be in unsaturated zones and the method of persulfate compound injection may be based on infiltration or trickling of the persulfate compound solution into the subsurface to provide sufficient contact of the soils with the injected chemicals. Certain soils and conditions will require large amounts of persulfate compound to destroy soil oxidant demand, while other soils and conditions might not. For example, sandy soils having large grain size might have very little surface area, very little oxidizable compounds and therefore very little soil oxidant demand. On the other hand, silty or clayey soils, which are very fine grained, would have large surface area per unit volume. They are likely to also contain larger amounts of oxidizable compounds, and also may cause a greater degree of decomposition of the persulfate and thus have a higher overall soil oxidant demand.

For in situ soil treatment, injection rates must be chosen based upon the hydro geologic conditions, that is, the ability of the oxidizing solution to displace, mix and disperse with existing groundwater and move through the soil. Additionally, injection rates must be sufficient to satisfy the soil oxidant demand and arsenic oxidant demand in a realistic time frame. It is advantageous to clean up sites in both a cost effective and timely manner. Careful evaluation of site parameters is crucial. It is well known that soil permeability may change rapidly both as a function of depth and lateral dimension. Therefore, injection well locations are also site specific. Proper application of any remediation technology depends upon knowledge of the subsurface conditions, both chemical and physical, and this process is not different in that respect.

The method of the present invention may be carried out in situ or ex situ. In situ treatment is conducted in the physical environment where the contaminant(s) are found. Ex situ treatment involves removal of the contaminated medium from the location where it is found and treatment at a different location.

In order to describe the invention in more detail, the following example is set forth:

EXAMPLE

An aqueous solution having an arsenic (III) concentration of 35 mg/L was mixed with silty sand soil and allowed to equilibrate for 60 hours under a nitrogen atmosphere. The amounts of reagent listed in Table 1 were then mixed with 300 grams of such treated soil.

TABLE 1

Reagent summary.

| Sample Id. | Grams of Reagent Addition to 300 g of Soil | | |
|---|---|---|---|
| | Sodium persulfate | Zero valent iron | $Na_2PO_4$ |
| CTL | 0 | 0 | 0 |
| 1 | 0.6 | 0.06 | 0 |
| 2 | 1.5 | 0.15 | 0 |
| 3 | 0.6 | 0.06 | 0.06 |
| 4 | 1.5 | 0.15 | 0.15 |

Fifty grams of each of such treated soils were mixed with 100 mL of water and stored in sealed containers for the times indicated in Table 2. The water in such samples was decanted and the total arsenic concentration solubilized in such aqueous portion measured. The results of such testing are summarized in Table 2 below.

TABLE 2

Soluble Arsenic Concentration

| Sample Id. | Soluble Arsenic (mg/L) | | |
| --- | --- | --- | --- |
| | 0 days | 21 days | 48 days |
| CTL | 18 | 13 | 9 |
| 1 | — | 9 | 3 |
| 2 | — | 4 | 1 |
| 3 | — | 8 | 2 |
| 4 | — | 8 | 3 |

It is believed that the amount of soluble arsenic in the control ("CTL") sample decreased over time as further equilibration occurred. The above results demonstrate that the amount of soluble arsenic greatly decreased employing compositions comprising persulfate and ZVI.

What is claimed is:

1. A method for the treatment of an environmental medium contaminated with arsenic, comprising treating such medium with an effective amount of persulfate and zero valent iron, and a precipitation additive, wherein the precipitation additive is selected from the group consisting of phosphates salts, calcium hydroxide, calcium oxide, sodium hydroxide, sodium carbonate, calcium carbonate and mixtures thereof.

2. The method of claim 1, wherein the environmental medium is selected from soil, groundwater, process water or wastewater.

3. The method of claim 1, wherein the persulfate is a dipersulfate.

4. The method of claim 3, wherein the dipersulfate is selected from sodium, potassium or ammonium persulfate or a combination thereof.

5. The method of claim 1, wherein the persulfate is a monopersulfate.

6. The method of claim 5, wherein the monopersulfate is selected from sodium and potassium monopersulfate.

7. The method of claim 1, wherein the persulfate is a combination of a dipersulfate and monopersulfate.

8. The method of claim 1 wherein the zero valent iron has a nanoscale particle size of from 10 nanometers to 1 micron.

9. The method of claim 1 wherein the zero valent iron has a micro scale particle size of from 1 micron to 300 microns.

10. The method of claim 1 wherein the environmental medium is water and the concentration of the persulfate is from 0.5 mg/L to 250,000 mg/L of water.

11. The method of claim 1 wherein the environmental medium is soil and the concentration of the persulfate is from 0.5 g/kg to 50 g/kg of soil.

12. The method of claim 1 wherein the treatment is performed in situ or ex situ.

13. The method of claim 1 wherein the zero valent iron is suspended if in a solution comprising sodium persulfate.

14. The method of claim 1 wherein the zero valent iron and sodium persulfate are added as solids.

15. The method of claim 1 wherein the weight ratio of persulfate to zero valent iron is between 1:1 and 1:20.

16. The method of claim 15 wherein the weight ratio of persulfate to zero valent iron is between 1:5 and 1:15.

* * * * *